(No Model.) 3 Sheets—Sheet 2.
P. J. LOONIE.
COTTON HARVESTER.
No. 430,429. Patented June 17, 1890.
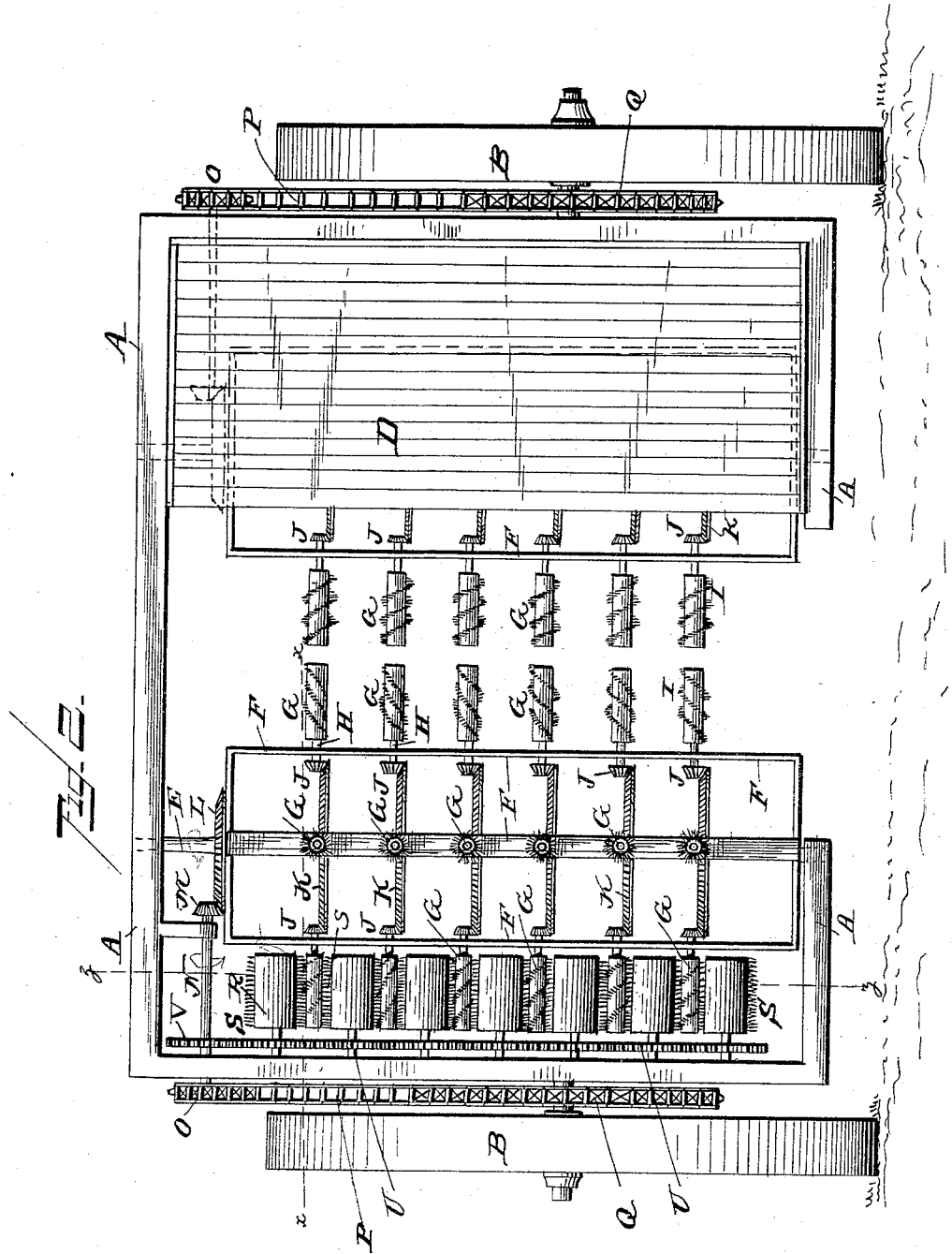
WITNESSES:
INVENTOR
Patrick J. Loonie (No Model.) 3 Sheets—Sheet 3.
P. J. LOONIE.
COTTON HARVESTER.
No. 430,429. Patented June 17, 1890.
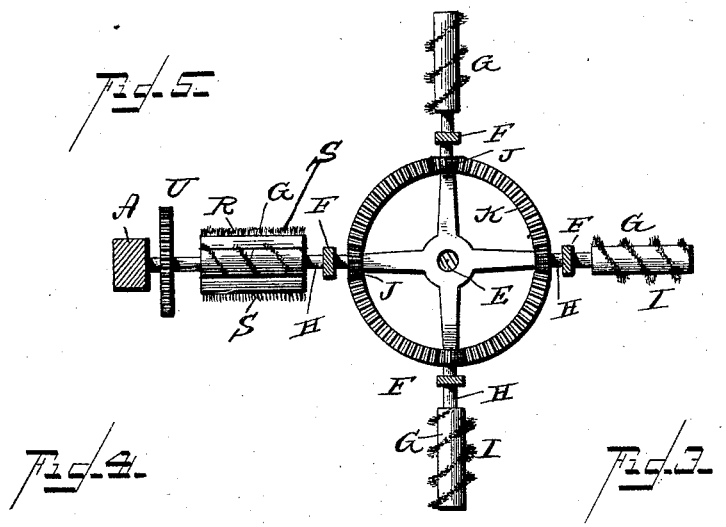
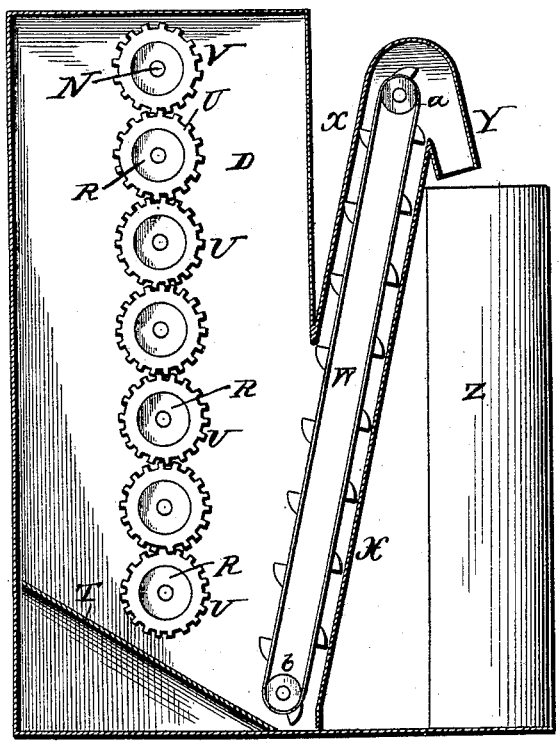
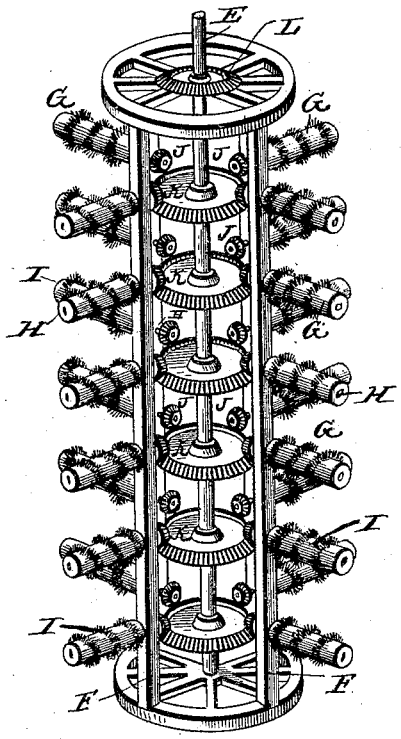
WITNESSES:
INVENTOR:
Patrick J. Loonie

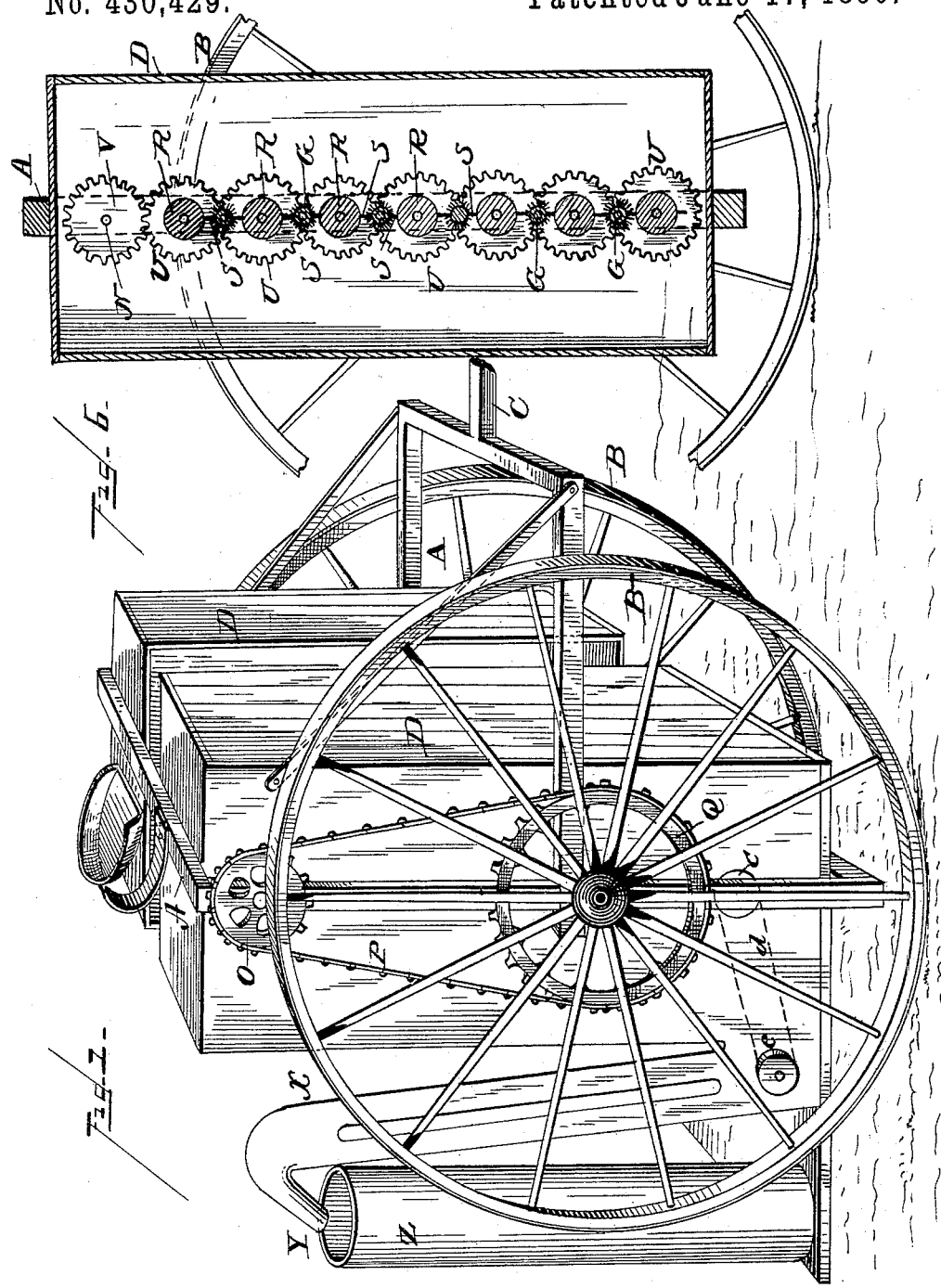

UNITED STATES PATENT OFFICE.

PATRICK J. LOONIE, OF DALLAS, TEXAS.

COTTON-HARVESTER.

SPECIFICATION forming part of Letters Patent No. 430,429, dated June 17, 1890.

Application filed February 6, 1890. Serial No. 339,502. (No model.)

*To all whom it may concern:*

Be it known that I, PATRICK J. LOONIE, a citizen of the United States, and a resident of Dallas, in the county of Dallas and State of Texas, have invented certain new and useful Improvements in Cotton-Harvesters; and I do hereby declare that the following is a full, clear, and exact description of the invention, which will enable others skilled in the art to which it appertains to make and use the same, reference being had to the accompanying drawings, which form part of this specification, and in which—

Figure 1 is a perspective view of my machine for harvesting or gathering cotton as it appears when ready for the field. Fig. 2 is a rear elevation of the machine. Fig. 3 is a perspective detail view of one of the vertical revolving picker-cylinders with its radially-projecting rotary pickers or gatherers. Fig. 4 is a detail view in section of the doffing-box with its inclined chute and elevator attachment. Fig. 5 is a sectional view on the horizontal plane denoted by the broken line marked $x$ $x$ in Fig. 2, and Fig. 6 is a vertical transverse sectional view through the doffers and pickers on line $z$ $z$ in Fig. 2.

Like letters of reference denote corresponding parts in all the figures.

My invention relates to cotton-harvesters of that class in which the machine, when in use in the field, passes successively over the rows of plants from which the cotton is to be gathered, the plants, as the machine advances, passing between two oppositely-arranged series of revolving picker-fingers or gatherers, from which the lint is subsequently doffed by the fingers passing between revolving doffer-cylinders and dropped to the bottom of the machine, after which it is raised by an elevator attachment and discharged into a collecting box or bag attached to the rear part of the machine.

The object of my invention is to simplify the construction of that class of machines and increase their durability as well as general efficiency, so as to produce a strong and thoroughly practical machine at a comparatively small cost, which shall not be liable to get out of order by the rough usage to which such machines are necessarily more or less subjected, and which may be operated by a person of ordinary intelligence, and without special mechanical skill.

With these objects in view my invention consists in the improved construction and combination of parts of a machine of the aforesaid type, as will be hereinafter more fully set forth.

The body of my machine consists of a light yet durable frame A, mounted on wheels B B and provided with a tongue C, to which the team is hitched. The frame A forms a support for two boxes or compartments D D, one on each side, which contain the operative elements of the machine. As these are exactly alike in both boxes D, (one being merely a duplication of the other,) a description of the construction and combination of the parts contained in one of these boxes will suffice for both.

A shaft E is fastened vertically in the frame A, so as to form a bearing for the revolving skeleton cylinder F, through the axis of which said fixed shaft E passes. This cylinder F forms, with its sides, bearings or journals for the inner ends of the revolving pickers G, which project in vertical rows or series radially from the circumference of the cylinder. Each picker or "gatherer" consists of a central shaft H and a cylindrical enlargement I, the circumference of which is provided with spirally-arranged bristles of sufficient length and stiffness to pick the cotton from the bolls. The central shaft H is journaled in the side of the cylinder, and has on its inner end within the cylinder a small bevel-pinion J, which meshes with a bevel cog-wheel K, fixed centrally upon the stationary central axis E of cylinder F. From this construction and combination of parts it will be observed that when the cylinder is rotated upon its fixed central shaft or axis the pickers G will rotate with it, each in its own horizontal plane, and at the same time, through the media of the pinions J and fixed cog-wheels K, each picker will revolve around its own axis. A rotary motion is imparted to the picker-carrying cylinder by means of a concentric cog-wheel L, secured upon the spokes which form the upper head of the cylinder and which gears with a bevel-wheel M, fastened upon the inner end of a shaft N, suitably journaled in the main frame and provided on its projecting outer end with a sprocket-wheel O, which receives motion through the chain P and main drive-wheel Q, which latter is fastened upon and revolves with its appropriate wheel B. As the two sets of pickers, each within its appropriate box or inclosure D on opposite sides of the machine, revolve simultaneously and in unison, they will pull and gather the lint from the cotton-filled bolls as the plants pass between the two pairs or sets of fingers. The next step will be to relieve or doff the pickers of the lint collected thereon, and this I accomplish in the following manner: On each side of the machine, journaled in the upright sides of the main frame A, is a vertical series of revolving doffers, each consisting of a cylindrical body R, provided with two rows of teeth S S, which I call the "doffer combs." The size and position of the doffer-cylinders relative to the picker-fingers and the length of the doffer-combs are such that as the fingers charged with loose lint or cotton pass between the doffers the revolving combs will pull the cotton off of the bristles on the pickers and drop it upon an inclined plane T in the bottom of the box or inclosure D, within which this apparatus is contained. In this manner the revolving pickers are cleared of collected cotton at each half-revolution of the upright picker-carrying cylinder F, this clearing or doffing of the pickers being rendered very complete and effective through the combined operations of the pickers revolving in one direction, one of the doffers on one side of each picker revolving in the opposite direction, and the other on the other side of the picker revolving in the same direction, or with the picker, but at a different ratio of speed, as the sets or series of revolving pickers and doffers pass between one another during the revolutions of the picker-carrying cylinder F. The mechanism for revolving the doffers R S in this manner is very simple and will be understood at a glance on the drawings, from which it will be seen that the central shaft of each doffer-cylinder is provided with a cog-wheel U, the whole series of cog-wheels intermeshing with one another, so as to give a direct and positive revolving motion to each doffer and cause the whole row or series to revolve at uniform speed. Motion is imparted to the series of intermeshing doffer-wheels U through the main drive-wheel Q, chain P, upper sprocket-wheel O, shaft N, and a cog-wheel V, fastened upon said shaft and gearing with the uppermost doffer-wheel U. There are of course two sets of these doffers with their appropriate actuating mechanism—one on each side of the machine or for each set of pickers.

As the gathered cotton is doffed and dropped on the inclined plane T in the bottom of the box it is immediately removed to prevent choking up of the mechanism by means of the elevator W, which is of the usual construction and works within an inclined covered chute X, having a downwardly-projecting spout or outlet Y at its upper end, which discharges into a removable receptacle Z. The endless band of the elevator revolves with and around two drums $a$ and $b$, a revolving motion being imparted to the lower drum $b$ by means of a pulley $e$, belt $d$, and pulley $c$ on the projecting outer end of the shaft of the lowermost doffer-wheel U. There are of course two of these elevators with their appropriate receptacles, one for each set of pickers on each side of the machine.

From the foregoing description, taken in connection with the drawings, it will be seen that my machine is very simple in its construction, and consisting, as it does, of comparatively few parts, which are operated in a simple manner by positive motion, there are no delicate or complicated parts to get out of order. Another and important advantage of this construction is that the machine can be built of light weight, so as to greatly relieve the team, as compared with the complicated, more cumbersome, and heavier machines of the same type.

Having thus described my invention, I claim and desire to secure by Letters Patent of the United States—

1. In a cotton-harvester, the combination of the picker-carrying cylinders revolving around a fixed vertical shaft, the stationary cog-wheels within said cylinders, the radially-projecting pickers journaled in the cylinders and provided at their inner ends with pinions meshing with the stationary cog-wheels, and the doffers revolving in alternately opposite directions, arranged in a vertical row on one side of the cylinders, and so spaced as to permit the pickers to pass between them at each half-revolution of the pickers, substantially as described.

2. In a cotton-harvester, the combination of the frame A, fixed shafts E, cog-wheels K, fastened equidistant upon said shafts, pickers G, having shafts H and pinions J, skeleton cylinders F, having concentric fixed cog-wheels L, shaft N, having the cog-wheels M and sprocket-wheel O, the doffer-wheels U, meshing with each other and revolving in alternately opposite directions, the doffers R, having the teeth S S, and revolving in unison with wheels U, the drive-chain P, and main drive-wheel Q, substantially as described.

3. In a cotton-harvester, the combination of the frame A, fixed shafts E, cog-wheels K, fastened equidistant upon said shafts, pickers G, having shafts H and pinions J, skeleton cylinders F, having concentric fixed cog-wheels L, shaft N, having the cog-wheels M and sprocket-wheel O, the doffer-wheels U, meshing with each other and revolving in alternately opposite directions, the doffers R, having the teeth S S, and revolving in unison with the wheels U, the inclined plane T, elevators W, and the described mechanism for operating the latter, substantially as described.

In testimony that I claim the foregoing as my own I have hereunto affixed my signature in presence of two witnesses.

PATRICK J. LOONIE.

Witnesses:
LOUIS BAGGER,
AUGUST PETERSON.